United States Patent [19]

Brosius et al.

[11] Patent Number: 5,362,808

[45] Date of Patent: Nov. 8, 1994

[54] BISMALEIMIDE-CROSSLINKED, FLEXIBLE POLYOLEFIN BLENDS

[75] Inventors: Sibylle Brosius, Ludwigshafen; Bernd L. Marczinke; Harald Schwager, both of Speyer, all of Germany

[73] Assignee: BASF Aktiengesellschaft, Ludwigshafen, Germany

[21] Appl. No.: 21,424

[22] Filed: Jun. 7, 1993

[30] Foreign Application Priority Data

Jun. 17, 1992 [DE] Germany .................. 4219863

[51] Int. Cl.$^5$ .................. C08K 3/24; C08L 23/26; C08L 9/02; C08L 33/08; C08L 53/00
[52] U.S. Cl. .................. 525/88; 525/93; 525/95; 525/193
[58] Field of Search ............ 525/193, 73, 88, 93, 525/95

[56] References Cited

U.S. PATENT DOCUMENTS

| | | | |
|---|---|---|---|
| 3,641,215 | 2/1972 | Usamoto et al. | 525/232 |
| 4,212,787 | 7/1980 | Matsuda et al. | 525/211 |
| 4,454,092 | 6/1984 | Shimizu et al. | 525/197 |
| 4,822,855 | 4/1989 | Kobayashi et al. | 525/193 |
| 4,871,813 | 10/1989 | Senez | 525/240 |
| 4,906,683 | 3/1990 | Komatsu et al. | 525/195 |
| 4,948,840 | 8/1990 | Berta | 525/193 |
| 4,985,502 | 1/1991 | Izumi et al. | 525/240 |
| 5,021,500 | 6/1991 | Puydak et al. | 525/193 |
| 5,073,597 | 12/1991 | Puydak et al. | 525/193 |
| 5,180,769 | 1/1993 | Hikasa et al. | 525/198 |

FOREIGN PATENT DOCUMENTS 143131 6/1985 European Pat. Off. .
58-034837 3/1983 Japan .

OTHER PUBLICATIONS

Use of Dimaleimides as Accelerators for the Radiation Induced . . . Journal of Polymer Science, vol. 58, pp. 737-754 (1962) . . . Miller et al.
Peroxidische Vulkanisationssysteme mit verzogerter Wirkung, Chow et al. Gummi-Asbest-Kunststoffe 31 (1978) 716.

Primary Examiner—Carman J. Seccuro, Jr.
Attorney, Agent, or Firm—Keil & Weinkauf

[57] ABSTRACT

Partially crosslinked polyolefin blends contain a) a polymer of from 25 to 97% by weight of a propylene polymer (I), which contains from 0 to 15% by weight of polymerized $C_2$-$C_{10}$-alka-1-enes, and of from 3 to 75% by weight of a further propylene polymer (II) which contains from 15 to 80% by weight of polymerized $C_2$-$C_{10}$-alka-1-enes, b) a random ethylene copolymer containing from 5 to 20% by weight of polymerized $C_3$-$C_{10}$-alk-1-enes and having a density of from 0.89 to 0.925 g/cm$^3$ at room temperature, c) a rubber-like material having a Shore A hardness of from 30 to 90 and d) a bismaleimido compound of the following formula (I)

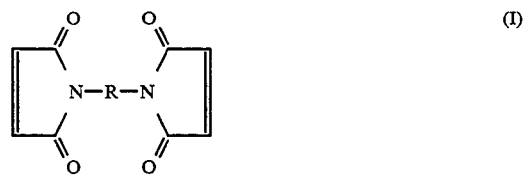

where R is $C_1$-$C_{20}$-alkyl which may be interrupted by one or more oxygen atoms, $C_5$-$C_7$-cycloalkyl or $C_6$-$C_{15}$-aryl, each of which in turn may be substituted by one or more $C_1$-$C_{10}$-alkyl and/or $C_1$-$C_6$-alkoxy and/or $C_1$-$C_4$-dialkylamino groups, or a radical of the following formula (II)

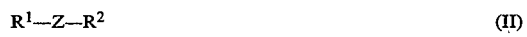

where $R^1$ and $R^2$ independently of one another are each $C_1$-$C_{10}$-alkyl, $C_5$-$C_7$-cycloalkyl or $C_6$-$C_{10}$-aryl, each of which in turn may be substituted by one or more $C_1$-$C_{10}$-alkyl and/or $C_1$-$C_6$-alkoxy and/or $C_1$-$C_4$-dialkylamino groups, and Z is $C_1$-$C_{10}$-alkyl, $C_1$-$C_4$-dialkylamino, oxgen or sulfonyl.

14 Claims, No Drawings

BISMALEIMIDE-CROSSLINKED, FLEXIBLE POLYOLEFIN BLENDS

The present invention relates to partially crosslinked polyolefin blends containing a) a polymer of from 25 to 97% by weight of a propylene polymer (I), which contains from 0 to 15% by weight of polymerized $C_2$–$C_{10}$-alk-1-enes, and from 3 to 75% by weight of further propylene polymer (II) which contains from 15 to 80% by weight of polymerized $C_2$–$C_{10}$-alky-1-enes, b) a random ethylene copolymer with from 5 to 20% by weight of polymerized $C_3$–$C_{10}$-alk-1-enes and having a density of from 0.89 to 0.925 g/cm$^3$ at room temperature, c) a rubber-like material having a Shore A hardness of from 30 to 90 and d) a bismaleimido compound of the following formula (I)

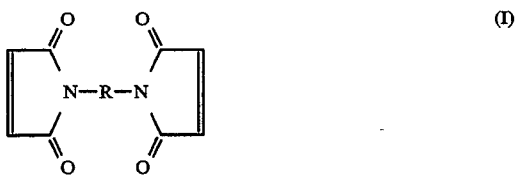

where R is $C_1$–$C_{20}$-alkyl which may be interrupted by one or more oxygen atoms, $C_5$–$C_7$-cycloalkyl or $C_6$–$C_{15}$-aryl, each of which in turn may be substituted by one or more $C_1$–$C_{10}$-alkyl and/or $C_1$–$C_6$-alkoxy and/or $C_1$–$C_4$-dialkylamino groups, or a radical of the formula (II)

$$R^1\text{---}Z\text{---}R^2 \qquad (II)$$

where $R^1$ and $R^2$ independently of one another are each $C_1$–$C_{10}$-alkyl, $C_5$–$C_7$-cycloalkyl or $C_6$–$C_{10}$-aryl, each of which in turn may be substituted by one or more $C_1$–$C_{10}$-alkyl and/or $C_1$–$C_6$-alkoxy and/or $C_1$–$C_4$-dialkylamino groups and Z is $C_1$–$C_6$-alkyl, $C_1$–$C_4$-dialkylamino, oxygen or sulfonyl.

The present invention furthermore relates to a process for the preparation of novel partially crosslinked polyolefin blends and films and moldings of these polyolefin blends.

Compared with uncrosslinked polymers, crosslinked polymers have the advantage of higher mechanical stability. However, owing to their low melt flow, completely crosslinked materials cannot be shaped thermally by the methods conventionally used in plastics technology (H. G. Elias Makromoleküle, Verlag Hüthig, & Wepf, 4th Edition, page 1000-1003). For the processing of polymers, it is therefore necessary to ensure that the degree of crosslinking of the polymers is not too high, so that they can still be shaped using the apparatuses conventionally employed in plastics technology.

It is known that polypropylenes or copolymers of propylene with unsaturated silanes can be crosslinked in the presence of a silanol condensation catalyst and of a peroxide (DE-A 33 27 149 and DE-A 35 20 106). The polymers obtained possess, inter alia, good low-temperature impact strength and high dimensional stability. However, crosslinking with the aid of unsaturated silanes is relatively expensive in terms of process engineering since three different components, the silane, the catalyst and the peroxide, must be used in this case.

DE-A 3 901 606 describes a process for the preparation of crosslinkable propylene copolymers, the copolymers used being grafted with maleic acid derivatives in a first step. Thereafter, the graft copolymers are reacted with polyfunctional amines or alcohols to give crosslinkable polymers. The products obtained in this manner have a long shelf life and can readily be further processed. However, the preparation of these crosslinkable polymers is relatively expensive since it is carried out in a plurality of successive steps. Moreover, the products obtained therefrom have either acidic or basic properties, which is undesirable for many industrial applications.

The crosslinking of rubber-like materials based on ethylene and propylene with the aid of bismaleimido compounds is also possible, provided that it is initiated by high-energy radiation (S. M. Miller et al., J. Polym. Sci. 58 (1982), 737), by sulfur-containing crosslinking systems (W. Hofmann, Kautschuk+Gummi, Kunststoffe No. 4/87, 308) or by peroxide compounds (Y. W. Chow, G. T. Knight, Gummi-Asbest-Kunststoffe 31 (1978), 716). In these processes, however, a decrease in the molecular weight of the propylene polymer, resulting in a deterioration in its mechanical properties, is frequently observed. In addition, these processes are technically relatively complicated.

It is an object of the present invention to remedy the disadvantages described and to provide partially crosslinked polyolefin blends which have good performance characteristics and can be prepared by an inexpensive process.

We have found that this object is achieved by the partially crosslinked polyolefin blends defined at the outset.

The novel partially crosslinked polyolefin blends contain a polymer a) of from 25 to 97% by weight of a propylene polymer (I), which contains from 0 to 15% by weight of polymerized $C_2$–$C_{10}$-alk-1-enes, and of from 3 to 75% by weight of a further propylene polymer (II) containing from 15 to 80% by weight of polymerized $C_2$–$C_{10}$-alk-1-enes. Preferred polymers a) are those which consist of from 35 to 95% by weight of a propylene polymer (I) with from 0 to 12% by weight of polymerized $C_2$–$C_{10}$-alk-1-enes and of from 5 to 65% by weight of a propylene polymer (II) with from 20 to 75% by weight of polymerized $C_2$–$C_{10}$-alk-1-enes. Particularly preferred polymers a) contain from 40 to 93% by weight of a propylene polymer (I) with from 0 to 9% by weight of polymerized $C_2$–$C_{10}$-alk-1-enes and from 7 to 60% by weight of a propylene polymer (II) with from 25 to 70% by weight of polymerized $C_2$–$C_{10}$-alk-1-enes. Preferably a polymer a) which contains a propylene homopolymer as propylene polymer (I) may also be used.

In this context, Polymerized $C_2$–$C_{10}$-alk-1-enes are in particular ethylene, but-1-ene, pent-1-ene, hex-1-ene, hept-1-ene, oct-1-ene or mixtures of these comonomers, ethylene or but-1-ene being preferably used.

The preparation of the polymer a) to be used according to the invention can be carried out either batchwise or preferably continuously, in the conventional reactors used for the polymerization of propylene. Suitable reactors include continuously operated stirred kettles, and a number of stirred kettles connected in series may also be used. The reactors contain a solid bed of finely divided polymer which is usually kept in motion by stirring.

The polymerization can be carried out both in the gas phase and in solution or suspension.

The process can be carried out using the Ziegler-Natta catalysts usually used in polymerization technology. They contain, inter alia, cocatalysts in addition to a titanium-containing solid component. Suitable cocatalysts are aluminum compounds together with electron donor compounds.

For the preparation of the titanium-containing solid component, in general halides or alcoholates of trivalent or tetravalent titanium are used as titanium compounds, the chlorides of titanium, in particular titanium tetrachloride, being preferred. The titanium-containing solid component advantageously contains a finely divided carrier, silicas and aluminas as well as aluminum silicates of the empirical formula $SiO_2 \cdot aAl_2O_3$, where a is from 0.001 to 2, in particular from 0.01 to 0.5, having proven particularly useful.

The preferably used carriers have a particle diameter of from 0.1 to 1000 $\mu$m, in particular from 10 to 300 $\mu$m, a pore volume of from 0.1 to 10, in particular from 1.0 to 5.0, cm$^3$/g and a specific surface area of from 10 to 1,000, in particular from 100 to 500, m$^2$/g.

Compounds of magnesium are also among the compounds used in the preparation of the titanium-containing solid component. Particularly suitable compounds of this type are magnesium halides, alkylmagnesium and arylmagnesium, as well as alkoxymagnesium and aryloxymagnesium compounds, magnesium chloride, magnesium bromide and di-$C_1$-$C_{10}$-alkylamagnesium compounds being preferably used. The titanium-containing solid component may furthermore contain halogen, preferably chlorine or bromine.

The titanium-containing solid component also contains electron donor compounds, for example mono- or polyfunctional carboxylic acids, carboxylic anhydrides and carboxylates, ketones, ethers, alkohols, lactones and organophosphorus and organosilicon compounds. Preferably used electron donor compounds in the titanium-containing solid component are phthalic acid derivatives of the general formula (III)

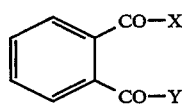

(III)

where X and Y are each chlorine or $C_1$-$C_{10}$-alkoxy or together are oxygen. Particularly preferred electron donor compounds are phthalates, X and Y being $C_1$-$C_8$-alkoxy, for example methoxy, ethoxy, propoxy or butoxy.

Other preferred electron donor compounds in the titanium-containing solid component include diesters of 3- or 4-membered, unsubstituted or substituted cycloalkane-1,2-dicarboxylic acids, and monoesters of unsubstituted or substituted benzophenone-2-carboxylic acids. The hydroxy compounds used in the case of these esters are the alcohols conventionally employed in esterification reactions, including $C_1$-$C_{15}$-alkanols, $C_5$-$C_7$-cycloalkanols, which in turn may carry $C_1$-$C_{10}$-alkyl groups, and phenols, napthols and the $C_1$-$C_{10}$-alkyl derivatives of these compounds.

The titanium-containing solid component can be prepared by conventional methods. Examples of these are described in, inter alia, EP-A 45 975, EP-A 86 473, EP-A 171 200, GB-A 2 111 066 and US-A 4 857 613.

In the preparation of the titanium-containing solid component, the three-stage process below is preferably used.

In the first stage, a solution of the magnesium-containing compound in a liquid alkane is first added to a finely divided carrier, preferably silica or $SiO_2 \cdot aAl_2O_3$ having a water content of from 0.5 to 5% by weight, where a is from 0.001 to 2, in particular from 0.01 to 0.5, after which this mixture is stirred for from 0.5 to 5 hours at from 10 to 120° C.

From 0.1 to 1 mol of the magnesium compound is preferably added per mol of the carrier. Thereafter, a halogen or a hydrogen halide, in particular chlorine or hydrogen chloride, is added with constant stirring, in at least a two-fold, preferably at least a five-fold, molar excess, based on the magnesium-containing compound. After from about 30 to 120 minutes, the solid is separated off from the liquid phase.

In the second stage, the product obtained in this manner is introduced into a liquid alkane, after which a $C_1$-$C_8$-alkanol, in particular ethanol, a halide or an alcoholate of trivalent or tetravalent titanium, in particular titanium tetrachloride, and an electron donor compound, in particular a phthalic acid derivative of the general formula III, are added. From 1 to 5, in particular from 2 to 4, mol of alkanol, from 2 to 20, in particular from 4 to 10, mol of the trivalent or tetravalent titanium and from 0.01 to 1, in particular from 0.01 to 1.0, mol of the electron donor compound are used per mol of magnesium of the solid obtained in the first stage. This mixture is stirred for at least one hour at from 10 to 150° C. and the solid material thus obtained is then filtered off and washed with a liquid alkane, preferably hexane or heptane.

In the third stage, the solid obtained in the second stage is extracted for a few hours at from 100 to 150° C. with excess titanium tetrachloride or with a solution, present in excess, of titanium tetrachloride in an inert solvent, preferably an alkylbenzene, the solvent containing at least 5% by weight of titanium tetrachloride. The product is then washed with a liquid alkane until the wash liquid contains less than 2% by weight of titanium tetrachloride.

The titanium-containing solid component obtainable in this manner is used with cocatalysts as a Ziegler-Natta catalyst system. Suitable cocatalysts are aluminum compounds and electron donor compounds.

Suitable aluminum compounds in addition to trialkylaluminum are compounds in which an alkyl group has been replaced with an alkoxy group or with a halogen atom, for example chlorine or bromine.

Trialkylaluminum compounds whose alkyl groups are each of 1 to 8 carbon atoms, for example trimethyl-, triethyl- or methyldiethylaluminum, are preferably used.

In addition to the aluminum compound, electron donor compounds, for example mono- or polyfunctional carboxylic acids, carboxylic anhydrides and carboxylates, ketones, ethers, alcohols, lactones and organophosphorus and organosilicon compounds, are preferably used as a further cocatalyst. Particularly suitable electron donor compounds are organosilicon compounds of the general formula (IV)

$$R^3{}_n Si(OR^4)_{4-n} \qquad (IV)$$

where the radicals $R^3$ are identical or different and are each $C_1$-$C_{10}$-alkyl or a 5-membered to 7-membered cycloalkyl group which in turn may carry a $C_1$-$C_{10}$-alkyl group, or are each $C_6$-$C_{20}$-aryl or arylalkyl, the radicals $R^4$ are identical or different and are each $C_1$-$C_{20}$-alkyl and n is 1, 2 or 3. Particularly preferred compounds of this type are those in which $R^3$ is $C_1$-$C_8$-alkyl or a 5-membered to 7-membered cycloalkyl group, $R^4$ is $C_1$-$C_4$-alkyl and n is 1 or 2.

Among these compounds, dimethoxydiisopropylsilane, dimethoxyisobutylisopropylsilane, dimethoxydiisobutylsilane, dimethoxydicyclopentylsilane and diethoxyisobutylisopropylsilane are noteworthy.

Preferably used catalyst systems are those in which the atomic ratio of aluminum from the aluminum compound to titanium from the titanium-containing solid component is from 1:1 to 800:1, in particular from 2:1 to 200:1, and the molar ratio of the aluminum compound to the electron donor compound used as cocatalyst is from 1:1 to 100:1, in particular from 2:1 to 80:1. The catalyst components may be introduced into the polymerization system individually in any order or as a mixture of the components.

The polymers a) present in the novel, partially crosslinked polyolefin blends can be prepared with the aid of such catalysts. In a preferred two-stage process, the propylene polymer (I) is initially prepared in a first polymerization stage and the propylene polymer (II) is then prepared in a second polymerization stage.

The polymerization of the propylene and, if required, of the corresponding $C_2$-$C_{10}$-alk-1-enes in the first polymerization stage is usually carried out at from 20 to 40 bar, preferably from 25 to 35, bar and from 60° to 90° C., preferably from 65° to 85° C., and in an average residence time of the reaction mixture of from 1 to 5, preferably from 1.5 to 4, hours. The reaction conditions are preferably chosen so that, in this first polymerization stage, from 0.05 to 2 kg of the propylene polymer (I) are formed per mmol of the aluminum component. In particular, ethylene and but-1-ene or a mixture of these comonomers is used as the $C_2$-$C_{10}$-alk-1-ene if the propylene polymer (I) is a copolymer. In this case, in the preparation of the propylene polymer (I) the propylene is copolymerized with the comonomers in a manner such that the ratio of the partial pressure of the propylene to that of the comonomers is brought to from 10:1 to 1,000:1, in particular from 15:1 to 500:1.

The propylene polymer (I) formed here is discharged together with the catalyst from the first polymerization stage after the end of the reaction and is introduced into the second polymerization stage, where the propylene polymer (II) is prepared.

This is effected in the second polymerization stage by polymerizing propylene together with one or more $C_2$-$C_{10}$-alk-1-enes in the presence of the propylene polymer (I) at from 5 to 25, preferably from 10 to 20, bar and from 30° C. to 80° C., preferably from 40° to 70° C. and in average residence times of the reaction mixture of from 1 to 5, preferably from 1.5 to 4, hours. The pressures in the second polymerization stage are usually at least 7, preferably at least 10, bar below those in the first polymerization stage. In particular, ethylene or but-1-ene or a mixture of these comonomers is used as the $C_2$-$C_{10}$-alk-1-ene. For the preparation of the propylene polymer (II), the propylene is polymerized with the comonomers in a manner such that the ratio of the partial pressure of the propylene to that of the comonomers is brought to from 0.5:1 to 20:1, in particular from 0.5:1 to 15:1. By a suitable choice of the polymerization parameters, it should also be ensured that the weight ratio of the monomers reacted in the first polymerization stage to those reacted in the second polymerization stage is from 0.5:1 to 20:1, in particular from 0.6:1 to 10:1.

The melt flow indices of the polymers a) obtainable in this manner are from 0.1 to 100, in particular from 0.5 to 50, g/10 min at 230° C. and 2.16 kg, according to DIN 53,735. The melt flow index corresponds to the amount of polymer which is discharged at 230° C. and under a weight of 2.16 kg from the test apparatus standardized according to DIN 53,735.

Furthermore, the novel partially crosslinked polyolefin blend contains, in addition to the polymer a), a random ethylene copolymer b) with from 5 to 20% by weight of polymerized $C_3$-$C_{10}$-alk-1-enes, whose density is from 0.89 to 0.925 $g/cm^3$ at room temperature. A random ethylene copolymer b) of this type which contains from 8 to 20% by weight of polymerized $C_3$-$C_{10}$-alk-1-enes is preferably used. In this context, polymerized $C_3$-$C_{10}$-alk-1-enes are understood as meaning in particular propylene, but-1-ene, pent-1-ene, hex-1-ene, hept-1-ene or oct-1-ene or a mixture of these comonomers, propylene, but-1-ene, hex-1-ene or oct-1-ene being preferably used.

The preparation of such random ethylene copolymers is usually carried out by low pressure polymerization of the comonomers using metal-containing catalysts, for example with the aid of titanium- and aluminum-containing Ziegler catalysts. The polymerization reaction can be carried out using the reactors conventionally employed in industry, for example stirred kettles, in the gas phase, in solution or in suspension. In a preferably used process, the ethylene copolymers b) employed according to the invention are prepared by gas phase polymerization with the aid of Ziegler catalysts at from 10 to 100 bar and from 30 to 100° C. having average residence times of from 0.5 to 5 hours. In this process, the ratio of the partial pressure of ethylene to that of the $C_3$-$C_{10}$-alk-alk-1-enes is brought to from 2:1 to 100:1.

Moreover, a rubber-like material c) having a Shore A hardness of from 30 to 90 (according to DIN 53,505) is also present in the novel partially cross-linked polyolefin blend. In the hardness determination according to Shore, the depth of penetration of a truncated cone into the sample material is determined. Examples of rubber-like materials c) include styrene/-butadiene block copolymers, styrene/ethylene/butene terpolymers, acrylate rubbers, ethylene/propylene rubbers, ethylene/-propylene/diene rubbers, isoprene rubbers, styrene/isoprene rubbers, polyisobutylene rubbers, ethylene/vinyl acetate copolymers, polyurethane rubbers, nitrile rubbers and natural rubbers. Styrene/-ethylene/butene terpolymers, ethylene/propylene rubbers, ethylene/-propylene/diene rubbers, polyisobutylene rubbers and acrylate rubbers are preferably used.

In the preparation of the novel partly crosslinked polyolefin blend, the polymer a), the random ethylene copolymer b) and the rubber-like material c) are combined with the bismaleimido compound d). The bismaleimido compound d) effects partial crosslinking of the polyolefin blend. The random ethylene copolymer b) and the rubber-like material c) may be mixed with the polymer a) before or after the reaction with the bismaleimido compound d).

Bismaleimido compounds d) which are used in the novel polyolefin blend are compounds of the following formula (I)

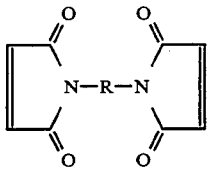 (I)

where R is $C_1$–$C_{20}$-alkyl which may be interrupted by one or more oxygen atoms,
$C_5$–$C_7$-cycloalkyl or $C_6$–$C_{15}$-aryl, each of which may in turn be substituted by one or more $C_1$–$C_{10}$-alkyl and/or $C_1$–$C_6$-alkoxy and/or $C_1$–$C_4$-dialkylamino groups, or a radical of the following formula II

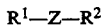 (II)

where $R^1$ and $R^2$ independently of one another are each $C_1$–$C_6$-alkyl, $C_5$–$C_7$-cycloalkyl or $C_6$–$C_{10}$-aryl, each of which in turn may be substituted by one or more $C_1$–$C_{10}$ alkyl and/or $C_1$–$C_6$-alkoxy and/or $C_1$–$C_4$-dialkylamino groups, and Z is $C_1$–$C_{10}$-alkyl, $C_1$–$C_4$-dialkylamino, oxygen or sulfonyl.

Among these bismaleimido compounds d), particularly noteworthy compounds are those in which R is $C_2$–$C_{10}$-alkyl which may be interrupted by one or more oxygen atoms, $C_5$–$C_7$-cycloalkyl or $C_6$–$C_{15}$-aryl, each of which may in turn be substituted by one or more $C_1$–$C_4$-alky groups, or a radical of the following formula II $R^1$-Z-$R^2$, where $R^1$ and $R^2$ independently of one another are each $C_1$–$C_6$-alkyl, $C_5$–$C_7$-cycloalkyl or $C_6$–$C_{10}$-aryl, and Z is oxygen or sulfonyl.

The following compounds are particularly preferably used as bismaleimido compounds d): 1,6-bismaleimidohexane, 1,3-bismaleimidobenzene, 1,3-bismaleimido-4-methylbenzene, 4,4'-bismaleimidodiphenylmethane, 4,4'-bismaleimido-3,5,3',5'-tetramethyldiphenylmethane and 3,3'-bismaleimidodiphenyl sulfone.

The bismaleimido compounds can be prepared, for example, by reacting maleic anhydride with the corresponding diamines and then with acetic acid and sodium acetate. Preparation processes of this type are known to the skilled worker.

The novel, partially crosslinked polyolefin blends are obtainable, inter alia, by reacting the polymer a), the random ethylene copolymer b) and the rubber-like material c) with the bismaleimido compound d) at from 180° to 280° C., preferably from 190° to 260° C., and from 1 to 100, preferably from 1 to 50, bar and in an average residence time of the reaction mixture of from 0.2 to 10, preferably from 0.2 to 5, minutes. The novel polyolefin blends can also be prepared, inter alia, by first reacting the polymer a) with the bismaleimido compound d) and then adding the random ethylene copolymer b) and the rubber-like material c). The reaction of the individual components is carried out in the apparatuses usually used in plastics processing for combining substances, for example in drum mixers, mills, screw or disk extruders, roll mills or kneaders.

In a preferred embodiment, the novel, partially crosslinked polyolefin blend contains, as further component, a random propylene copolymer e) with from 1 to 10% by weight of polymerized $C_2$–$C_{10}$-alk-1-enes. A random propylene copolymer e) which contains from 2 to 8%by weight of $C_2$–$C_{10}$-alk-1-is preferred. $C_2$–$C_{10}$-alk-1-enes in this context are in particular ethylene, but-1-ene, pent-1-ene, hex-1-ene, hept-1-ene and oct-1-ene or mixtures of these comonomers, ethylene and but-1ene being preferably used.

The preparation of such random propylene copolymers e) can be carried out in the gas phase, in solution or in suspension, using the Ziegler-Natta catalysts usually employed in polymerization technology. Suitable reactors for these propylene copolymers e) include batchwise or continuously operated stirred kettles, and a number of stirred kettles may also be connected in series. The reactors contain a fixed bed of finely divided polymer which is usually kept in motion by stirring. In a preferably used preparation process, the random propylene copolymers e) are prepared by polymerizing propylene with the further $C_2$–$C_{10}$-alk-1-ene in a reactor at from 20 to 40 bar and from 30° to 100° C. and in an average residence time of from 1 to 5 hours with the aid of a Ziegler-Natta catalyst system from the gas phase and bringing the ratio of partial pressure of propylene to that of the $C_2$–$C_{10}$-alk-1-ene to from 5:1 to 100:1.

The random propylene copolymer e) can be mixed with the polymer a), the random ethylene copolymer b) and the rubber-like material c) both before and after the reaction with the bismaleimido compound d).

The novel, partially crosslinked polyolefin blends preferably contain from 35 to 90 parts by weight of polymer a), from 5 to 60 parts by weight of random ethylene copolymer b), from 5 to 40 parts by weight of rubber-like material c) and from 0 to 20 parts by weight of random propylene copolymer e), based on 100 parts by weight. A polyolefin blend which consists of from 50 to 80 parts by weight of polymer a), from 5 to 30 parts by weight of random ethylene copolymer b), from 5 to 30 parts by weight of rubber-like material c) and from 0 to 15 parts by weight of random propylene copolymer e), based on 100 parts by weight, is particularly preferred. In a possible preparation process, the individual components of the polyolefin blend, ie. a), b), c) and, if required, d), are first mixed in a mixing apparatus, for example in an extruder or a mill, and then partially crosslinked by reaction with the bismaleimido compound d). In another preparation process, the polymer a) is reacted with the bismaleimido compound d), and components b), c) and, if required, e) are then admixed.

For the preparation of the novel, partially crosslinked polyolefin blends, from 0.001 to 5 parts by weight of the bismaleimido compound d) are used per 100 parts by weight of the components a), b), c) and, if present, e). Preferred partially crosslinked polyolefin blends are those which contain from 0.01 to 2 parts by weight, in particular from 0.02 to 1 part by weight, of the bismaleimido compound d) per 100 parts by weight of the components a), b), c) and, if present, e).

In a preferred preparation process, the polymer a) is first reacted, immediately after its preparation, with corresponding amounts of the bismaleimido compound d) in a mixing apparatus connected to the preparation reactor of the polymer a). Thereafter, corresponding amounts of the components b), c) and, if required, e) are added to this partially crosslinked mixture. After the end of the reaction, the partially crosslinked plastics material is discharged from the mixing apparatus and is separated from volatile starting materials in a shaft dryer connected to said mixing apparatus. The polyolefin blend obtained in this manner can be directly further processed.

The reaction of the components a), b), c) and, if required, e) with the bismaleimido compound d) can also be carried out in the presence of free radical initiators. Preferably used free radical initiators are organic peroxides or azo compounds. Organic peroxide compounds which have half-lives of from 1 to 30 seconds at 210° C. are preferably used. Among these compounds, dicumyl peroxide, monocumyl tert-butyl peroxide, di-tert-butyl peroxide, 2,5-dimethyl-2,5-di-(tert-butylperoxy)-hexane and 2,5-dimethyl-2,5-di-(tert-butylperoxy)-hex-3-yne are particularly noteworthy.

In this case, from 0.001 to 2 parts by weight of the free radical initiator are used per 100 parts by weight of the components a), b), c) and, if present, e) in the preparation of the novel, partially crosslinked polyolefin blends.

From 0.001 to 1, in particular from 0.002 to 0.5, part by weight of the free radical initiator is preferably used per 100 parts by weight of components a), b), c) and, if present, e).

The novel partially crosslinked polyolefin blends have a melt flow index of from 0.01 to 30 g/10 min at 230° C. and under a weight of 2.16 kg. The melt flow index corresponds to the amount of polymer which is forced, in the course of 10 minutes at 230° C. and under a weight of 2.16 kg, out of the test apparatus standardized according to DIN 53,735. Particularly preferred partially crosslinked plastics materials are those whose melt flow index is from 0.02 to 5 g/10 min at 230° C. and under a weight of 2.16 kg. They may also contain a relatively small amount of the additive conventionally used in plastics technology, for example talc, carbon black or metal carbonates.

By choosing the special components of the polyolefin blend and the bismaleimido compound d) partially crosslinked polyolefin blends are obtained which exhibit in particular high dimensional stability, good elongation properties and easy processability. The novel, partially crosslinked polyolefin blends are obtainable in a simple manner since the crosslinking reaction can be carried out in one step and the number of substances required for this purpose is limited.

Owing to their relatively good processability, the novel partially crosslinked plastics materials are particularly suitable as materials for injection molding, blow molding, extrusion and the production of foams. They can be used for the production of moldings, films and coating materials.

EXAMPLES

Examples 1–5 and Comparative Examples A–C were carried out in a twin-screw extruder from Werner & Pfleiderer, having a length/diameter ratio of 30. The components a), b), c) and, if required, e) used in the polyolefin blend were fed to the twin-screw extruder as grit or granules. The reaction of the bismaleimido compound d) with the components a), b), c) and, if present, e) was carried out in all Examples at from 220° to 250° C. and from 10 to 20 bar in an average residence time of up to 1 minute.

EXAMPLE 1

I. First, 100 parts by weight of a polymer a) of 55% by weight of a propylene copolymer with 2.5% by weight of polymerized ethylene and of 45% by weight of a further propylene copolymer with 60% by weight of polymerized ethylene were mixed with 0.4 part by weight of 1,3-bismaleimidobenzene in a twin-screw extruder at 240° C. and 10 bar and in an average residence time of 30 seconds. The melt flow index of the polymer a) was 0.9 g/10 min at 230° C. and 2.16 kg, according to DIN 53,735.

II. 70 parts by weight of the partially crosslinked polymer a) obtained in this manner were then mixed, in a twin-screw extruder, with 10 parts by weight of a random ethylene copolymer b) containing 16% by weight of polymerized but-1-ene and having a melt flow index of 1.4 g/10 min at 230° C. and 2.16 kg according to DIN 53,735 and a density of 0.9 g/cm$^3$ and 20 parts by weight of an ethylene/propylene copolymer as rubber-like material c), having a propylene content of 25% by weight, a melt flow index of 3 g/10 min at 230° C. and 10 kg according to ASTM D 1238 and a Shore A hardness of 84, and 0.25 part by weight of carbon black. Mixing was effected at 220° C. and 20 bar and in an average residence time of 28 seconds.

A film 420 mm wide and 0.3 mm thick was produced from the resulting partially crosslinked polyolefin blend by the cast film method in a slot die apparatus at 255° C. and 145 bar.

The melt flow index, the Shore D hardness and the sag of the film obtained in this manner are shown in Table 1 below.

EXAMPLE 2

Partial crosslinking was carried out similarly to Example 1, under the same conditions, using the same component a), b), c) and d). In this Example, the actual crosslinking step I was furthermore carried out in the presence of 0.01 part by weight, based on 100 parts by weight of polymer a), of 2,5-dimethyl-2,5-di-(tertbutylperoxy)-hexane.

A film 420 mm wide and 0.3 mm thick was produced from the resulting partially crosslinked polyolefin blend by the cast film method in a slot die apparatus at 255° C. and 145 bar.

The melt flow index, the Shore D hardness and the sag of the film obtained in this manner are shown in Table 1 below.

COMPARATIVE EXAMPLE A

The same components a), b) an c) were mixed with one another similarly to Example 1 according to the invention but no bismaleimido compound d) was added, so that no crosslinking took place.

A film 420 mm wide and 0.3 mm thick was produced from the resulting partially crosslinked polyolefin blend by the cast film method in a slot die apparatus at 260° C. and 135 bar.

The melt flow index, the Shore D hardness and the sag of the film obtained in this manner are shown in Table 1 below.

EXAMPLE 3

55 parts by weight of a polymer a) of 55% by weight of a propylene homopolymer and 45% by weight of a propylene copolymer containing 51% by weight of polymerized ethylene and having a melt flow index of 2.1 g/10 at 230° C. and 2.16 kg according to DIN 53,735 were mixed and crosslinked, in a twin-screw extruder at 240° C. and 20 bar and in an average residence time of 30 seconds, with 25 parts by weight of the random ethylene copolymer b) used in Example 1, 10 parts by weight of a rubber-like material c) and 10 parts by weight of a random propylene copolymer e). The rubber-like material c) used was a styrene/ethylene/but-1-ene terpolymer having a melt flow index of 2.4 g/10 min at 230° C. and 2.16 kg according to DIN 53,753 and a Shore A hardness of 75. The random propylene copolymer e) contained 4% by weight of polymerized ethylene and 2% by weight of but-1-ene and had a melt flow index of 5 g/10 min at 230° c. and 2.16 kg according to DIN 53,735. Crosslinking was carried out with the aid of 0.03 part by weight of 2,5-dimethyl-2,5-di-(tert-butylperoxy)-hexane and 0.3 part by weight of 1,3-bismaleimidobenzene. The mixture also contained 0.25 part by weight of carbon black.

A film 420 mm wide and 1 mm thick was produced from the resulting partially crosslinked polyolefin blend by the cast film method in a slot die apparatus at 255° c. and 145 bar.

The melt flow index, the Shore D hardness and the sag of the film obtained in this manner are shown in Table 1 below

EXAMPLE 4

55 parts by weight of the partially crosslinked polymer a) prepared in step I in Example 1 were mixed and crosslinked, in a twin-screw extruder under the same conditions as described in Example 3, with 25 parts by weight of the random ethylene copolymer e) used in Example 3, 10 parts by weight of the rubber-like material c) known from Example 3 and 10 parts by weight of the random propylene copolymer e) known from Example 3. The mixture also contained 0.25 part by weight of carbon black. In contrast to Example 3, crosslinking was effected in this case at 220° C.

A film 420 mm wide and 1 mm thick was produced from the resulting partially crosslinked polyolefin blend by the cast film method in a slot die apparatus at 255° C. and 145 bar.

The melt flow index, the Shore D hardness and the sag of the film obtained in this manner are shown in Table 1 below.

COMPARATIVE EXAMPLE B

A polyolefin blend was prepared similarly to Example 3 according to the invention, except that, in contrast to Example 3, no bismaleimido compound d) was added so that no crosslinking took place.

A film 420 mm wide and 1 mm thick was produced from the resulting partially crosslinked polyolefin blend by the cast film method in a slot die apparatus at 255° c. and 145 bar.

The melt flow index, the Shore D hardness and the sag of the film obtained in this manner are shown in Table 1 below.

TABLE 1

| Properties of the polyolefin blends obtained | | | | | |
|---|---|---|---|---|---|
| Examples | | Comp. | Examples | | Comp. |
| 1 | 2 | Example A | 3 | 4 | Example B |
| Melt flow index[a] [g/10 min] | | | | | |
| 0.5 | 0.4 | 0.7 | 0.24 | 0.7 | 1.7 |
| Shore D hardness[b] | | | | | |
| 34 | 36 | 32 | 41 | 41 | 37 |

TABLE 1-continued

| Properties of the polyolefin blends obtained | | | | | |
|---|---|---|---|---|---|
| Examples | | Comp. | Examples | | Comp. |
| 1 | 2 | Example A | 3 | 4 | Example B |
| Sag[c] [cm] 105 | 132 | 163 | 21 | 24 | 28 |

[a] At 230° C. and 2.16 kg, according to DIN 53,735
[b] According to DIN 53,505
[c] To measure the sag, the film was brought to a film surface temperature of 198° C. by means of infrared heating from above in a conventional deep-drawing apparatus. The film was clamped in a frame measuring 500 mm × 300 mm and was loaded with a weight of 50 g which moved a pointer via a tension apparatus, said pointer indicating the sag during heating. It should be noted that thinner films generally exhibit greater sag.

COMPARATIVE EXAMPLE C 100 parts by weight of the polymer a) used in Example 3 were mixed with 0.4 part by weight of 1,3-bis-maleimidobenzene at 240° C. and 10 bar and in an average residence time of 30 seconds.

A film 420 mm wide and 0.3 mm thick was produced from the resulting partially crosslinked polyolefin blend by the cast film method in a slot die apparatus at 255° C. and 145 bar.

The melt flow index, the Shore D hardness and the permanent elongation of the film obtained in this manner are shown in Table 2 below.

EXAMPLE 5

70 parts by weight of the blend obtained from Comparative Example C were mixed, at 220° C. and 20 bar and in an average residence time of 28 seconds, with 20 parts by weight of a rubber-like material c) of 50% by weight of polyisobutylene and 50% by weight of polyethylene having a melt flow index of 0.6 g/10 min at 230° C. and 2.16 kg according to DIN 53,735 and a Shore D hardness of 80 and with 10 parts by weight of the random ethylene copolymer b) used in Example 1. The polyolefin blend furthermore contained 0.25 part by weight of carbon black.

A film 420 mm wide and 0.3 mm thick was produced from the resulting partially crosslinked polyolefin blend by the cast film method in a slot die apparatus at 255° C. and 145 bar.

The melt flow index, the Shore D hardness and the sag of the film obtained in this manner are shown in Table 2 below.

TABLE 2

| Properties of the polyolefin blends obtained | | |
|---|---|---|
| | Example 5 | Comparative Example C |
| Melt flow index[a] [g/10 min] | 0.8 | 0.67 |
| Shore D hardness[b] | 37 | 49 |
| Permanent elongation[c] | 77 | 98 |

[a] At 230° C. and 2.16 kg, according to DIN 53,735
[b] According to DIN 53,505
[c] After 2 hours, measurement on 15 mm wide and 160 mm long film strips which were extended by 200% at a rate of 50 mm/min with the aid of a tensile test apparatus according to DIN 53,455.

A comparison of the novel Examples 1–5 with the Comparative Examples A–C clearly shows that the novel polyolefin blends in the form of films exhibit less sag (Examples 1 and 2 and Comparative Example A; Examples 3 and 4 and Comparative Example B). Moreover, the novel polyolefin blends have a smaller permanent elongation (Examples 5 and Comparative Example C).

We claim:

1. A partially crosslinked polyolefin blend, containing
   a) a two stage polymerized polymer of from 25 to 97% by weight of a propylene polymer (I), which contains from 0 to 15% by weight of polymerized $C_2$-$C_{10}$-alk-1-enes, and of from 3 to 75% by weight of a further propylene polymer (II) which contains a greater amount of polymerized $C_2$-$C_{10}$-alk-1-enes than in (I) ranging from 15 to 80% by weight of polymerized $C_2$-$C_{10}$-alk-1-enes,
   b) a random ethylene copolymer with from 5 to 20% by weight of polymerized $C_3$-$C_{10}$-alk-1-enes and having a density of from 0.89 to 0.925 g/cm$^3$ at room temperature,
   c) a rubber material having a Shore A hardness of from 30 to 90 which differs from polymer a) and which is selected from the group consisting of ethylene/vinyl acetate copolymers, nitrile rubbers, styrene/ethylene/butene terpolymers, ethylene/propylene rubbers, ethylene/propylene/diene rubbers and acrylate rubber, and
   d) a bismaleimido compound of the following formula (I)

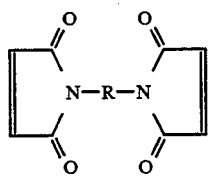

(I)

where R is $C_1$-$C_{10}$-alkyl which may be interrupted by one or more oxygen atoms, $C_5$-$C_7$-cycloalkyl or $C_6$-$C_{15}$-aryl, each of which in turn may be substituted by one or more $C_1$-$C_{10}$-alkyl or $C_1$-$C_6$-alkoxy or $C_1$-$C_4$-dialkylamino groups, or a radical of the following formula (II)

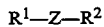   (II)

where $R^1$ and $R^2$ independently of one another are each $C_1$-$C_{10}$-alkyl, $C_5$-$C_7$-cycloalkyl or $C_6$-$C_{10}$-aryl, each of which in turn may be substituted by one or more $C_1$-$C_{10}$-alkyl or $C_1$-$C_6$-alkoxy or $C_1$-$C_4$-dialkylamino groups and Z is $C_1$-$C_{10}$-alkyl, $C_1$-$C_4$-dialkylamino, oxygen or sulfonyl and optionally as a further component e) a random propylene copolymer with from 1 to 10% by weight of polymerized $C_2$-$C_{10}$-alk-1-enes.

2. A partially crosslinked polyolefin blend as claimed in claim 1, which contains, as a further component e) a random propylene copolymer with from 1 to 10% by weight of polymerized $C_2$-$C_{10}$-alk-1-enes.

3. A partially crosslinked polyolefin blend as claimed in claim 1, wherein the polymer a) consists of from 35 to 95% by weight of a propylene polymer (I) with from 0 to 12% by weight of polymerized $C_2$-$C_{10}$-alk-1-enes and of from 5 to 65% by weight of a propylene polymer (II) with from 20 to 75% by weight of polymerized $C_2$-$C_{10}$-alk-1-enes.

4. A partially crosslinked polyolefin blend as claimed in claim 1, wherein the polymer a) contains a propylene homopolymer as propylene polymer (I).

5. A partially crosslinked polyolefin blend as claimed in claim 1, wherein the bismaleimido compound d) used is a compound of the formula (I) where R is $C_2$-$C_{10}$-alkyl which may be interrupted by one or more oxygen atoms, $C_5$-$C_7$-cycloalkyl or $C_6$-$C_{15}$-aryl, each of which in turn may be substituted by one or more $C_1$-$C_4$-alkyl groups, or a radical of the formula (II) $R^1$-Z-$R^2$, where $R^1$ and $R^2$ independently of one another are each $C_1$-$C_6$-alkyl, $C_5$-$C_7$-cycloalkyl or $C_6$-$C_{10}$-aryl and Z is oxygen or sulfonyl.

6. A partially crosslinked polyolefin blend as claimed in claim 1, wherein the polymers a), b), c) and e) are used in the following ratios, based on 100 parts by weight:
   from 35 to 90 parts by weight of polymer a) from 5 to 60 parts by weight of random ethylene copolymer b)
   from 5 to 40 parts by weight of rubber-like material c)
   from 0 to 20 parts by weight of random propylene copolymer e).

7. A partially crosslinked polyolefin blend as claimed in claim 1, wherein from 0.001 to 5 parts by weight of the bismaleimido compound d) are used per 100 parts by weight of the components a), b), c) and, if present, e).

8. A process for the preparation of a partially crosslinked polyolefin blend as claimed in claim 1, wherein the components a), b), c) and, if present, e) are reacted with the bismaleimido compound e) at from 180° to 280° C. and from 1 to 100 bar and in an average residence time of the reaction mixture of from 0.2 to 10 minutes.

9. A process for the preparation of a partially crosslinked polyolefin blend as claimed in claim 8, wherein the bismaleimido compound d) is first reacted with the polymer a) immediately after its preparation in a mixing apparatus connected to the preparation reactor, and the components b), c) and, if present, e) are then added.

10. A process for the preparation of a partially crosslinked polyolefin blend as claimed in claim 8, wherein the reaction of the components a), b), c) and, if present, e) with the bismaleimido compound d) is carried out in the presence of a free radical initiator.

11. A film or molding of a partially crosslinked polyolefin blend as claimed in claim 1.

12. The blend of claim 1 wherein compound (I) is 1,3-bismaleimidobenzene.

13. The blend of claim 12 wherein component c) is an ethylene/propylene copolymer.

14. The blend of claim 12 wherein component c) is a styrene/ethylene/but-1-ene terpolymer and compound.

* * * * *

UNITED STATES PATENT AND TRADEMARK OFFICE
CERTIFICATE OF CORRECTION

PATENT NO.: 5,362,808

DATED: November 8, 1994

INVENTOR(S): BROSIUS et al.

It is certified that error appears in the above-identified patent and that said Letters Patent is hereby corrected as shown below:

IN THE ABSTRACT, title page, item [57], col. 2,

Line 4: "alka" should read -- alk --.

Line 7: "alka" should read -- alk --.

Claim 1, column 13, line 32:
"$C_{10}$" should read -- $C_{20}$ --.

Signed and Sealed this

Third Day of January, 1995

BRUCE LEHMAN

Attest:

Attesting Officer

Commissioner of Patents and Trademarks